(12) United States Patent
Jensen et al.

(10) Patent No.: US 9,038,275 B2
(45) Date of Patent: May 26, 2015

(54) RECIPROCATING SAW DUST SHROUD

(75) Inventors: Stanford Jensen, Price, UT (US); Spencer Loveless, Price, UT (US)

(73) Assignee: Dustless Depot, LLC, Price, UT (US)

( * ) Notice: Subject to any disclaimer, the term of this patent is extended or adjusted under 35 U.S.C. 154(b) by 295 days.

(21) Appl. No.: 13/607,574

(22) Filed: Sep. 7, 2012

(65) Prior Publication Data
US 2013/0055577 A1 Mar. 7, 2013

Related U.S. Application Data

(60) Provisional application No. 61/531,864, filed on Sep. 7, 2011.

(51) Int. Cl.
*B23D 59/00* (2006.01)
(52) U.S. Cl.
CPC .................................... *B23D 59/006* (2013.01)
(58) Field of Classification Search
CPC ........ B23D 59/00; B23D 59/006; A47L 9/06; A47L 9/0606; A47L 9/0613
USPC .................. 30/123, 133, 392–394, 514, 516; 451/451, 453, 456; D8/70; 15/396–399; D32/31–33
See application file for complete search history.

(56) References Cited

U.S. PATENT DOCUMENTS

| 907,734 | A | | 12/1908 | Butterfield | |
|---|---|---|---|---|---|
| 1,123,562 | A | | 1/1915 | Lund | |
| RE15,262 | E | | 1/1922 | Gurgel | |
| 1,643,882 | A | | 9/1927 | Faiver | |
| 1,808,178 | A | * | 6/1931 | Santini | 15/399 |
| 1,852,839 | A | * | 4/1932 | Engberg et al. | 15/399 |
| D98,082 | S | * | 1/1936 | Lofgren | D32/33 |
| 2,032,382 | A | | 3/1936 | Torrison | |
| 2,041,689 | A | | 5/1936 | Baumeister | |
| D100,668 | S | * | 8/1936 | Lofgren | D32/33 |
| D103,240 | S | * | 2/1937 | Lofgren | D32/33 |
| 2,203,088 | A | * | 6/1940 | Hansson | 15/399 |
| 2,279,186 | A | | 4/1942 | Terry et al. | |
| 2,291,269 | A | | 7/1942 | Wiggleworth | |
| 2,294,272 | A | | 8/1942 | Boice | |
| 2,318,317 | A | * | 5/1943 | Lofgren | 15/398 |
| 2,350,949 | A | * | 6/1944 | Weimers | 15/399 |
| D141,802 | S | * | 7/1945 | Wittke | D32/33 |
| D141,807 | S | * | 7/1945 | Wittke | D32/33 |
| 2,384,688 | A | | 9/1945 | Morris | |
| D147,215 | S | * | 7/1947 | Dreyfuss | D32/33 |
| D148,315 | S | * | 1/1948 | Lippincott | D32/33 |
| D149,060 | S | * | 3/1948 | Harvuot | D32/33 |
| 2,469,256 | A | * | 5/1949 | Brakman | 15/398 |
| 2,503,854 | A | | 4/1950 | Trainor | |
| 2,520,725 | A | | 8/1950 | Judd | |

(Continued)

FOREIGN PATENT DOCUMENTS

EP 556713 8/1993
EP 0 579 964 1/1994

(Continued)

*Primary Examiner* — Jason Daniel Prone
(74) *Attorney, Agent, or Firm* — Brett Peterson; Pate Peterson, PLLC

(57) ABSTRACT

A dust shroud for reciprocating saws has a shroud body with bristles, a vacuum port and an attachment collar attached to the shroud body. The shroud has a slot formed through the collar and shroud body and is expandable and collapsible to fit different sizes of reciprocating saws.

20 Claims, 5 Drawing Sheets

(56) References Cited

U.S. PATENT DOCUMENTS

| | | | |
|---|---|---|---|
| D165,837 S * | 2/1952 | Hanson | D32/33 |
| 2,618,008 A * | 11/1952 | Hageal et al. | 15/399 |
| D175,227 S * | 7/1955 | Martinec | D32/33 |
| 2,730,753 A * | 1/1956 | Gerber | 15/399 |
| 2,747,217 A * | 5/1956 | Stahl | 15/399 |
| D178,141 S * | 6/1956 | Martinec | D32/33 |
| D179,671 S * | 2/1957 | Andersson-Sason | D32/33 |
| 2,803,098 A | 8/1957 | Robert et al. | |
| 2,814,066 A * | 11/1957 | Lesh, Jr. | 15/399 |
| 2,819,570 A * | 1/1958 | Tocci-Guilbert et al. | 451/451 |
| 2,819,571 A | 1/1958 | Morgan | |
| 2,994,995 A | 8/1961 | Griffith | |
| 3,166,877 A | 1/1965 | Reames | |
| D200,194 S * | 2/1965 | Frost | D32/33 |
| 3,256,648 A | 6/1966 | Subonovich | |
| 3,468,076 A | 9/1969 | Jones | |
| 3,667,170 A | 6/1972 | MacKay | |
| 3,673,744 A | 7/1972 | Oimoen | |
| 3,826,045 A * | 7/1974 | Champayne | 451/456 |
| 3,835,543 A | 9/1974 | Polydoris et al. | |
| 3,848,686 A | 11/1974 | Jysky et al. | |
| 3,862,521 A | 1/1975 | Isaksson | |
| 3,882,598 A | 5/1975 | Earle et al. | |
| 3,882,644 A * | 5/1975 | Cusumano | 451/456 |
| 3,945,281 A | 3/1976 | Kreitz | |
| 3,987,589 A * | 10/1976 | Marton | 15/398 |
| 4,011,792 A * | 3/1977 | Davis | 408/241 R |
| D244,274 S * | 5/1977 | Winard et al. | D32/33 |
| 4,063,478 A | 12/1977 | Stuy | |
| 4,090,297 A | 5/1978 | Wanner | |
| 4,135,334 A | 1/1979 | Rudiger | |
| 4,201,256 A | 5/1980 | Truhan | |
| 4,253,362 A | 3/1981 | Olson | |
| 4,326,864 A | 4/1982 | Sittler | |
| 4,367,665 A | 1/1983 | Terpstra et al. | |
| 4,381,628 A | 5/1983 | Dicke | |
| 4,400,995 A | 8/1983 | Palm | |
| 4,515,504 A * | 5/1985 | Moore, Sr. | 30/136.5 |
| 4,574,532 A | 3/1986 | Haberle et al. | |
| 4,576,072 A | 3/1986 | Terpstra et al. | |
| 4,622,782 A | 11/1986 | Roestenberg | |
| 4,646,480 A * | 3/1987 | Williams | 451/456 |
| 4,688,294 A * | 8/1987 | Simonsson | 15/398 |
| 4,697,389 A | 10/1987 | Romine | |
| 4,761,877 A | 8/1988 | Rupp | |
| 4,765,099 A * | 8/1988 | Tanner | 451/456 |
| 4,782,632 A | 11/1988 | Matechuk | |
| 4,868,949 A | 9/1989 | Loveless et al. | |
| 4,891,915 A * | 1/1990 | Yasuda | 451/451 |
| 4,897,894 A * | 2/1990 | Fahlen | 15/398 |
| 4,921,375 A | 5/1990 | Famulari | |
| 4,932,163 A | 6/1990 | Chilton et al. | |
| 4,932,164 A | 6/1990 | Sullivan et al. | |
| 5,033,552 A | 7/1991 | Hu | |
| 5,034,041 A * | 7/1991 | Austin | 30/166.3 |
| 5,069,695 A * | 12/1991 | Austin | 30/133 |
| 5,074,044 A * | 12/1991 | Duncan et al. | 30/124 |
| 5,084,972 A | 2/1992 | Waugh | |
| 5,105,585 A | 4/1992 | Hampl et al. | |
| 5,125,190 A | 6/1992 | Buser et al. | |
| 5,131,192 A | 7/1992 | Cheng | |
| 5,163,252 A | 11/1992 | Garner et al. | |
| 5,167,215 A | 12/1992 | Harding, Jr. | |
| 5,176,408 A | 1/1993 | Pedersen | |
| 5,201,785 A | 4/1993 | Nagano | |
| 5,237,781 A | 8/1993 | Demetrius | |
| 5,327,649 A | 7/1994 | Skinner | |
| 5,339,571 A | 8/1994 | Timmons et al. | |
| D350,852 S * | 9/1994 | Ferrazzutti | D32/33 |
| 5,345,651 A * | 9/1994 | Roberts | 15/398 |
| D355,059 S * | 1/1995 | Ennis | D32/33 |
| 5,411,433 A * | 5/1995 | Keller | 451/451 |
| D359,148 S * | 6/1995 | Henrie | D32/33 |
| 5,435,066 A | 7/1995 | Bare | |
| 5,440,809 A | 8/1995 | Padilla | |
| 5,445,056 A | 8/1995 | Folci | |
| D369,448 S * | 4/1996 | de Blois et al. | D32/33 |
| 5,527,207 A * | 6/1996 | Azar et al. | 451/451 |
| 5,545,082 A | 8/1996 | Courson et al. | |
| 5,558,571 A | 9/1996 | Toyoshima et al. | |
| 5,564,408 A | 10/1996 | Bassols | |
| 5,566,457 A | 10/1996 | Batschari et al. | |
| 5,575,035 A | 11/1996 | Reis et al. | |
| 5,582,225 A | 12/1996 | Schank | |
| 5,588,213 A | 12/1996 | Swanberg | |
| 5,609,516 A | 3/1997 | Courson et al. | |
| 5,653,561 A | 8/1997 | May | |
| 5,675,895 A | 10/1997 | Mori et al. | |
| 5,688,082 A | 11/1997 | Richardson | |
| 5,704,956 A | 1/1998 | Loveless et al. | |
| 5,713,785 A | 2/1998 | Nishio | |
| D392,531 S * | 3/1998 | Richardson | D8/70 |
| D392,780 S * | 3/1998 | Holsten et al. | D32/33 |
| 5,774,992 A | 7/1998 | Lindenmuth | |
| 5,791,979 A | 8/1998 | Duncan et al. | |
| 5,816,733 A | 10/1998 | Ishikawa et al. | |
| 5,819,619 A | 10/1998 | Miller et al. | |
| 5,839,161 A * | 11/1998 | Liang | 15/398 |
| 5,931,072 A | 8/1999 | Shibata | |
| 5,954,863 A | 9/1999 | Loveless et al. | |
| 6,027,399 A | 2/2000 | Stewart | |
| 6,053,674 A | 4/2000 | Thompson | |
| 6,108,912 A | 8/2000 | Radigan | |
| 6,167,626 B1 | 1/2001 | Doumani et al. | |
| 6,183,527 B1 | 2/2001 | O'Banion et al. | |
| 6,219,922 B1 | 4/2001 | Campbell et al. | |
| 6,273,081 B1 | 8/2001 | Gorgol et al. | |
| 6,318,352 B1 | 11/2001 | Gnazzo et al. | |
| 6,347,985 B1 | 2/2002 | Loveless | |
| D456,234 S * | 4/2002 | Keller | D8/70 |
| D456,685 S * | 5/2002 | Keller | D8/70 |
| D458,825 S * | 6/2002 | Keller et al. | D8/70 |
| 6,470,778 B1 | 10/2002 | Kaye, Jr. et al. | |
| 6,471,574 B1 | 10/2002 | Rupprecht et al. | |
| D470,633 S * | 2/2003 | Kitts | D32/33 |
| 6,557,261 B1 | 5/2003 | Buser et al. | |
| 6,648,742 B1 | 11/2003 | Segiel | |
| 6,651,343 B2 * | 11/2003 | Laren et al. | 30/133 |
| 6,678,960 B2 * | 1/2004 | Williams | 30/391 |
| 6,679,145 B1 | 1/2004 | Lee | |
| 6,699,114 B1 | 3/2004 | Booeshaghi et al. | |
| 6,726,554 B1 | 4/2004 | Chen et al. | |
| 6,748,660 B2 | 6/2004 | Buser et al. | |
| 6,796,208 B1 | 9/2004 | Jorgensen | |
| 6,811,476 B2 | 11/2004 | Ohlendorf | |
| 6,823,907 B2 | 11/2004 | Cheng | |
| 6,860,799 B2 | 3/2005 | Loveless | |
| 6,878,050 B2 | 4/2005 | Wendt et al. | |
| 6,896,605 B2 | 5/2005 | Ohlendorf | |
| 6,902,594 B2 | 6/2005 | Cho | |
| 6,935,939 B1 | 8/2005 | Buser et al. | |
| 6,948,412 B2 | 9/2005 | Brazell et al. | |
| 6,960,124 B2 | 11/2005 | Lee | |
| 6,988,939 B2 * | 1/2006 | Hofmann et al. | 451/344 |
| 6,997,653 B2 | 2/2006 | Styles | |
| 7,013,884 B2 | 3/2006 | Guth | |
| 7,014,547 B2 * | 3/2006 | Kleider | 451/359 |
| D519,696 S * | 4/2006 | Adams | D32/33 |
| D520,201 S * | 5/2006 | Dyson et al. | D32/33 |
| D520,202 S * | 5/2006 | Dyson et al. | D32/33 |
| 7,044,039 B2 | 5/2006 | Powell | |
| 7,044,843 B1 | 5/2006 | Lin | |
| 7,047,647 B1 | 5/2006 | Muller et al. | |
| 7,047,650 B2 | 5/2006 | Chen | |
| 7,069,831 B2 | 7/2006 | Chang | |
| 7,171,880 B2 | 2/2007 | Powell | |
| D537,691 S * | 3/2007 | Lamprecht et al. | D8/70 |
| D537,692 S * | 3/2007 | Aglassinger | D8/70 |
| 7,195,429 B2 | 3/2007 | Dods et al. | |
| 7,197,826 B2 | 4/2007 | Baxivanelis | |
| 7,198,559 B2 | 4/2007 | Walstrum et al. | |
| 7,204,178 B2 | 4/2007 | Bergmann | |
| 7,216,572 B2 | 5/2007 | Keenan | |
| 7,222,560 B2 | 5/2007 | Parks et al. | |

(56) References Cited

U.S. PATENT DOCUMENTS

| | | | |
|---|---|---|---|
| 7,223,161 B2 | 5/2007 | Kodani et al. | |
| 7,260,869 B2 * | 8/2007 | Kim | 15/398 |
| D553,933 S * | 10/2007 | Esenwein | D8/70 |
| 7,300,337 B1 | 11/2007 | Sun et al. | |
| 7,322,429 B2 * | 1/2008 | Kim | 173/171 |
| 7,438,633 B2 | 10/2008 | Jespersen | |
| D593,389 S * | 6/2009 | Clayton | D8/70 |
| 7,578,063 B2 | 8/2009 | Martin | |
| 7,625,265 B2 * | 12/2009 | Woods et al. | 451/451 |
| 7,628,682 B2 * | 12/2009 | Andrasic et al. | 451/451 |
| 7,635,293 B2 | 12/2009 | Sun et al. | |
| 7,661,195 B1 * | 2/2010 | Wood et al. | 30/392 |
| D614,678 S * | 4/2010 | Jorgensen et al. | D8/70 |
| 7,740,086 B2 | 6/2010 | Bleicher et al. | |
| 7,805,805 B2 | 10/2010 | Loveless | |
| 7,887,624 B2 | 2/2011 | Ekstrom et al. | |
| 7,892,075 B2 | 2/2011 | Esenwein | |
| 8,011,398 B2 | 9/2011 | Loveless | |
| 8,133,094 B2 * | 3/2012 | Loveless et al. | 451/453 |
| 8,137,165 B2 | 3/2012 | Loveless | |
| D659,923 S * | 5/2012 | Dyson | D32/33 |
| 8,177,606 B2 | 5/2012 | Loveless | |
| D672,104 S * | 12/2012 | Steele | D32/33 |
| D700,760 S * | 3/2014 | Chu et al. | D32/33 |
| 8,662,964 B2 * | 3/2014 | Hiller | 451/451 |
| 8,740,674 B2 * | 6/2014 | Esenwein | 451/451 |
| 2003/0104767 A1 * | 6/2003 | Chilton | 451/41 |
| 2004/0206220 A1 | 10/2004 | Keenan | |
| 2005/0088866 A1 | 4/2005 | Levine | |
| 2005/0155233 A1 | 7/2005 | Chen | |
| 2006/0005681 A1 | 1/2006 | Lambert et al. | |
| 2006/0019585 A1 | 1/2006 | Zayat | |
| 2007/0079589 A1 | 4/2007 | Ekstrom et al. | |
| 2007/0155296 A1 | 7/2007 | Hofmann et al. | |
| 2007/0178815 A1 | 8/2007 | Buser | |
| 2007/0193759 A1 | 8/2007 | Sweig et al. | |
| 2007/0251104 A1 | 11/2007 | Heinrichs | |
| 2008/0060631 A1 | 3/2008 | Dofher | |
| 2008/0099053 A1 | 5/2008 | Loveless | |
| 2008/0109986 A1 | 5/2008 | Loveless | |
| 2008/0163492 A1 | 7/2008 | Johansson | |
| 2008/0200103 A1 | 8/2008 | Esenwein | |
| 2009/0181604 A1 | 7/2009 | Loveless | |
| 2009/0181605 A1 | 7/2009 | Loveless | |
| 2009/0181606 A1 * | 7/2009 | Loveless et al. | 451/456 |
| 2009/0183377 A1 | 7/2009 | Loveless | |
| 2009/0183800 A1 | 7/2009 | Loveless | |
| 2009/0186559 A1 | 7/2009 | Loveless | |
| 2009/0241283 A1 | 10/2009 | Loveless | |
| 2009/0311953 A1 | 12/2009 | Maute et al. | |
| 2010/0170538 A1 * | 7/2010 | Baker et al. | 30/124 |
| 2010/0285729 A1 * | 11/2010 | Loveless et al. | 451/456 |
| 2010/0313867 A1 | 12/2010 | Loveless | |
| 2011/0021121 A1 | 1/2011 | Loveless | |
| 2011/0192262 A1 | 8/2011 | Loveless | |
| 2012/0084986 A1 * | 4/2012 | Klawitter | 30/516 |
| 2012/0142263 A1 * | 6/2012 | Burdick et al. | 454/66 |
| 2012/0186520 A1 * | 7/2012 | Hill | 451/451 |

FOREIGN PATENT DOCUMENTS

| | | |
|---|---|---|
| GB | 2 260 721 | 4/1993 |
| GB | 2 262 159 | 6/1993 |
| JP | 10-000559 | 1/1998 |
| JP | 10-15717 | 1/1998 |
| JP | 2001-96525 | 4/2001 |
| KR | 10-2002-0056086 | 7/2002 |
| WO | WO 99/44786 | 9/1999 |

* cited by examiner

RECIPROCATING SAW DUST SHROUD

PRIORITY

The present application claims the benefit of U.S. Provisional Application Ser. No. 61/531,864, filed Sep. 7, 2011, which is herein incorporated by reference in its entirety.

THE FIELD OF THE INVENTION

The present invention relates to dust collection. More specifically, the present invention relates to a universal dust collection shroud for reciprocating saws.

BACKGROUND

Dust collection has become increasingly important both for construction as well as for consumer or hobbyist use of power tools. Without adequate dust collection while working, dust and debris is typically scattered over a wide area. It is desirable to contain the dust and debris which is created while using power tools for several reasons. It is desirable to contain the dust and debris to keep the workplace cleaner and to minimize the time necessary to clean up afterwards. Reciprocating saws are often used for cutting materials such as wood or gypsum wall board. While cutting these materials, fine dust is often created which is spread over a large distance and can be quite difficult to clean up afterwards. It is also desirable to contain the dust and debris to keep the same from getting into the tool itself, as the fine dust often causes premature failure of the bearings, motor, etc. Additionally, dust poses a health risk to the machine operator and others who may breathe it. It is thus desirable to collect the dust to minimize any exposure to the dust.

There is a need for a dust shroud for reciprocating saws. There is a need for a dust shroud which is effective in capturing the dust and debris without interfering with the use of the saw. The shroud should not block the saw operator's view of the blade or reduce the usable length of the blade while still collecting dust well. There is also a need for a shroud which is universal and which works well with various different models of reciprocating saws.

SUMMARY OF THE INVENTION

It is an object of the present invention to provide an improved dust shroud for a reciprocating saw.

According to one aspect of the invention, a dust shroud is provided which has an attachment collar extending from the top of the dust shroud. The attachment collar is attached to the front of the saw body adjacent the blade. According to another aspect of the invention, the dust shroud has an opening formed along the front of the shroud. The opening extends along the attachment collar and shroud body. The shroud can bend and adjust to a larger or smaller size when attaching the shroud to a saw.

These and other aspects of the present invention are realized in a dust shroud as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
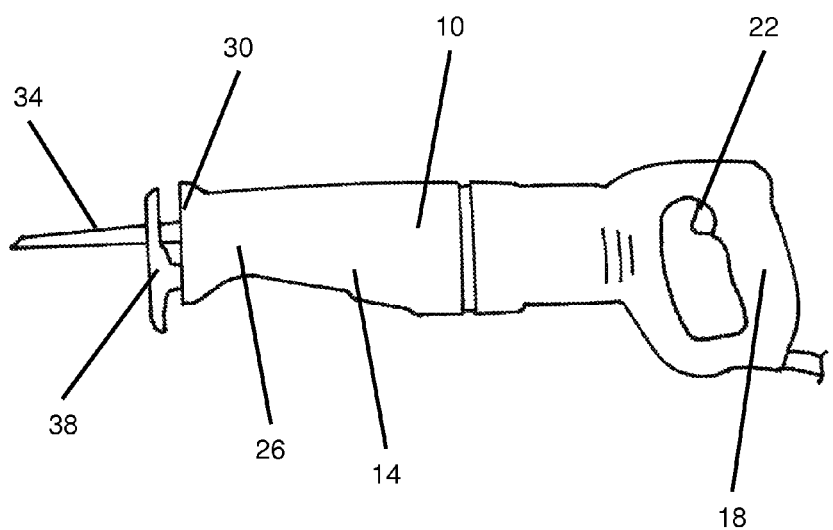
FIG. 1 shows a side view of prior art reciprocating saw.

Turning now to FIG. 1, a side view of a prior art reciprocating saw 10 is shown. The saw 10 has an elongate and generally linear body 14 which houses a motor and drive. A handle 18 is attached to the rear of the body and a power switch 22 is located within the handle. The saw body 14 and handle 18 are often about 18 inches long and about 4 inches wide and tall. A section of the front of the body 14 is formed into a front hand grip 26. The front hand grip 26 is usually a smaller diameter than the rest of the body 14; often about 2 inches in diameter. A larger front flange 30 is commonly formed in front of the hand grip 26. A saw blade 34 extends linearly out of the front of the saw, being attached to the motor via the drive. The saw blade 34 is commonly between 3 and 12 inches long, and more commonly between 4 and 6 inches long. The blade 34 oscillates linearly forwards and backwards to cut the desired material. A plate 38 extends across the front of the saw and contacts the material being cut during use of the saw 10 to steady the saw.

As mentioned, this type of reciprocating saw is frequently used in construction and other trades. Dust collection with these saws has been problematic due to several factors. The many different shapes and styles of saw which are made has been a particular obstacle in creating a dust shroud. In many cases, it is simply not economic to create a customized dust shroud for each model of reciprocating saw. Moreover, a dust shroud should not interfere with the use of the saw 10. The shroud should not obscure a person's ability to see the blade 34, as this would make it difficult to control the saw. Additionally, the shroud should not interfere with a person's ability to place the plate 38 against a piece of material which is being cut to stabilize the saw during use.

Figure 2:
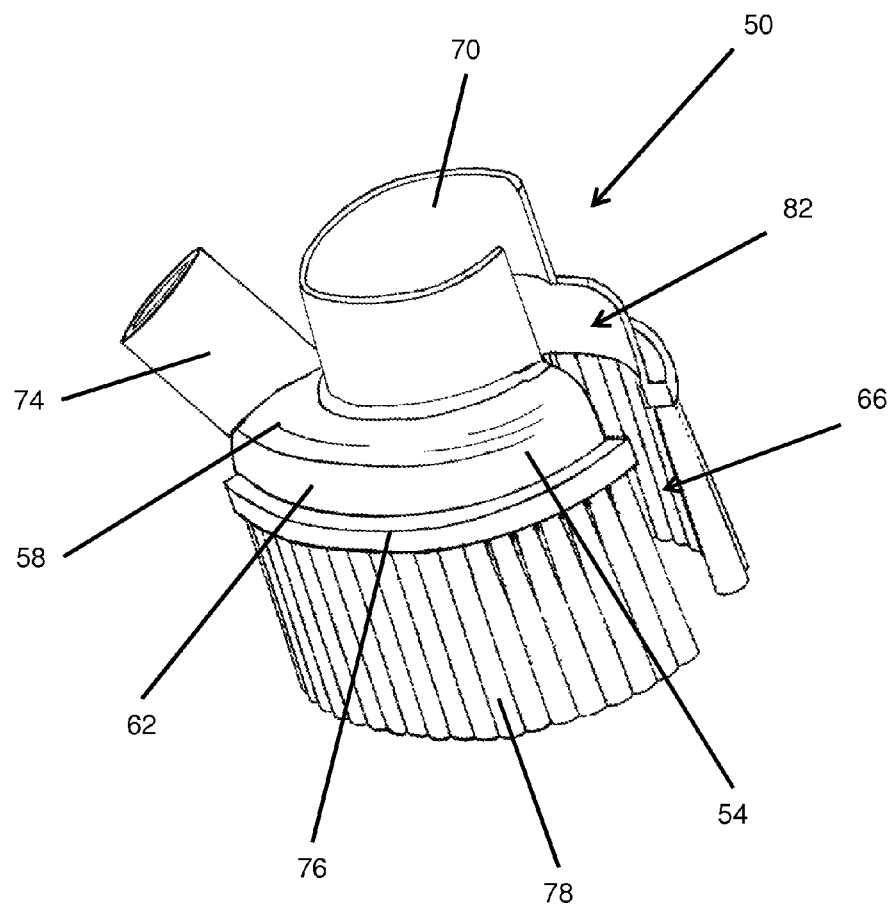
FIG. 2 shows a perspective view of a shroud according to the present invention.
Figure 3:
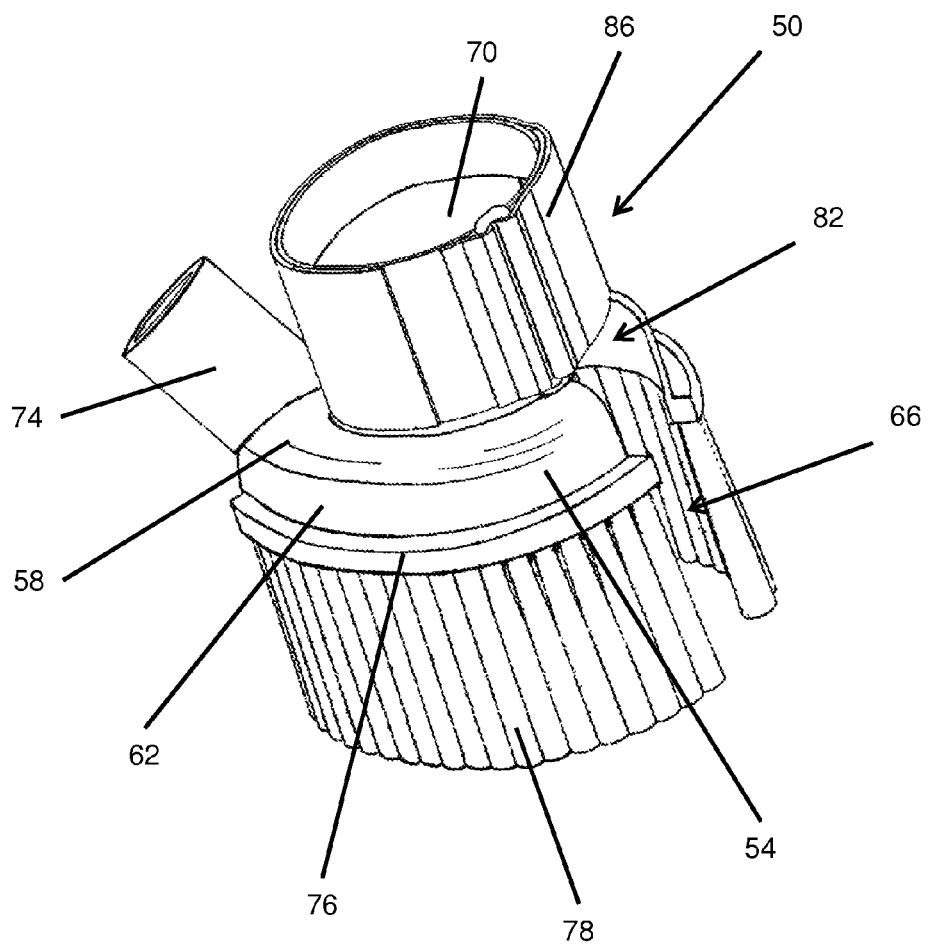
FIG. 3 shows another perspective view of the shroud of FIG. 2.
Figure 4:
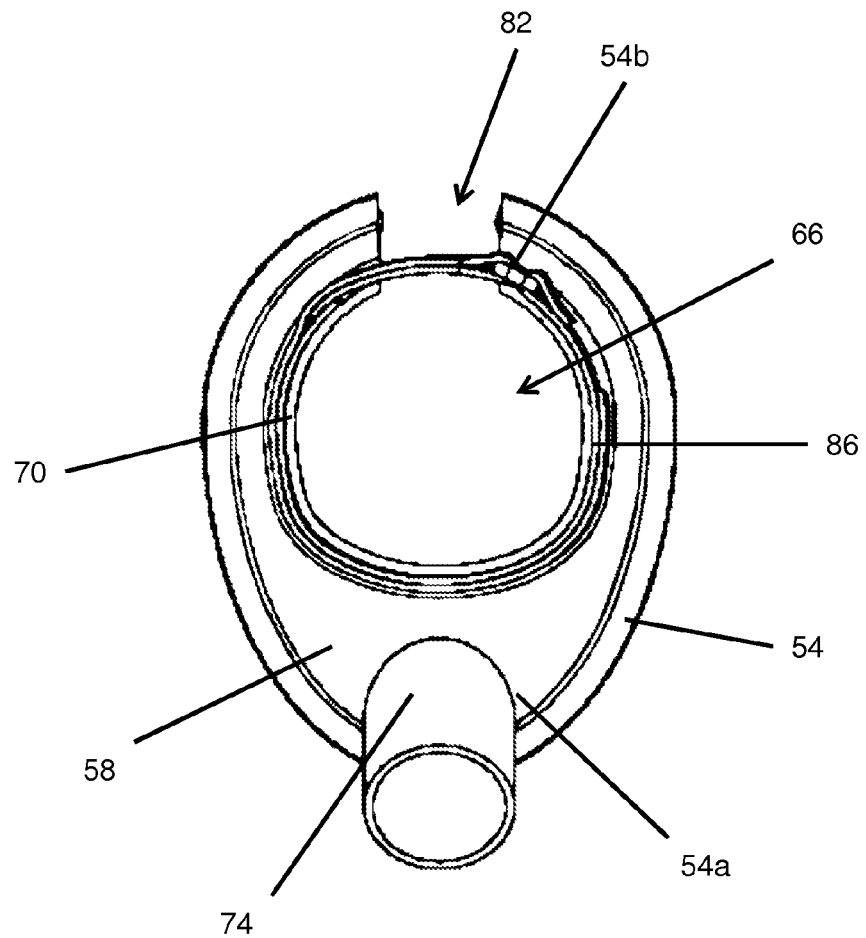
FIG. 4 shows a top view of the shroud of FIG. 2.

Turning now to FIGS. 2 through 4, two perspective views and a top view of a universal dust shroud 50 according to the present invention. The dust shroud 50 includes a shroud body 54. The shroud body may be generally oval or rectangular in shape as viewed from the top of the shroud. The shroud body 54 has an upper portion 58 and a peripheral wall 62 extending downwardly from the upper portion to extend around an interior dust collection chamber 66. An attachment collar 70 extends upwardly from the upper portion 58 of the shroud body 54. The interior of the collar 70 is open to the dust collection chamber 66.

A first end 54a of the shroud body 54 extends farther away from the attachment collar 70 than a second end 54b of the shroud body 54. The first end 54a of the shroud body 54 may also be narrower and more elongate in shape where the second end 54b of the shroud body 54 may be more rounded in shape.

A vacuum port 74 is attached to the first end 54a of the shroud body 54. The vacuum port 74 has an open interior which is sized for connection to a vacuum hose. The open interior of the vacuum port 74 is open to the dust collection chamber 66 so that a vacuum may draw dust and debris from the dust collection chamber 66.

Bristles 78, flaps or similar structures are attached to the bottom edge 76 of the peripheral wall 62. The bristles extend downwardly from the bottom of the peripheral wall 62. The bristles 78 contact the material which is being cut by a saw when the shroud and saw are in use, improving the seal between the shroud and the material to improve the dust collection efficiency of the shroud. The bristles help to keep debris within the shroud body until the debris can be removed by a vacuum.

A slot 82 is formed through the shroud body 54 (including the upper portion 58 and peripheral wall 62), attachment collar 70 and bristles 78 at the second end 54b of the shroud 50. The slot 82 serves several purposes. First, the slot allows the shroud 50 to be attached to various different reciprocating saws. The shroud body 54 and collar 70 are molded from a somewhat flexible material such as clear PVC. The slot 82 allows the shroud body 54 and collar 70 to expand to a larger size or collapse to a smaller size while maintaining a similar overall shape. This allows the shroud 50 to accommodate different sizes of reciprocating saws 10. The shroud 50 is unique in that the shroud body 54 is flexible and changes size and shape when fitted to different saws rather than having a shroud body 54 of fixed size and an attachment collar which alone is adjustable to different sizes.

The collar 70 may also change shape when fitted to different saws 10. The combination of a flexible collar 70 with a slot 82 through the collar may allow the collar to expand or contract into a taper in addition to simply changing diametrical size. This allows the collar to better fit different saws. The slot 82 allows a person to maintain good visibility of the blade 34 while using the saw 10, allowing the person to make an accurate cut. It will be appreciated that if a person cannot make an accurate cut with a dust shroud in place, the person will likely discontinue use of the dust shroud. Additionally, the slot 82 forms an air inlet to the dust collection chamber 66 and improves the dust collection abilities of the shroud 50. In use, air is drawn into the slot 82, around the blade and into the vacuum port 74.

An attachment strap 86 is used to attach the shroud 50 to a reciprocating saw 10. For a presently preferred embodiment, the attachment strap 86 uses hook and loop fastener material to allow a user to easily secure the strap without tools. The attachment strap 86 could also use snaps or be a metal band clamp such as a worm drive clamp. The attachment strap 86 is secured around the mounting collar 70 and presses the collar against a reciprocating saw 10 to hold the shroud 50 to the saw. The slot 82 allows the dust shroud 50 to easily collapse to a smaller size or expand to a larger size, allowing the shroud 50 to fit most reciprocating saws. The slot 82 may often be between about 0.5 and 1 inch wide, allowing the slot to provide adequate visibility, ventilation, and expansion and contraction capabilities for the shroud body. The attachment strap 86 allows users to loosen the strap and rotate the dust collection shroud 50 to a desired position for better use of the saw. A user may rotate the dust collection shroud 50 for better visibility of the blade when cutting upwards as compared to downwards, for example.

Figure 5:
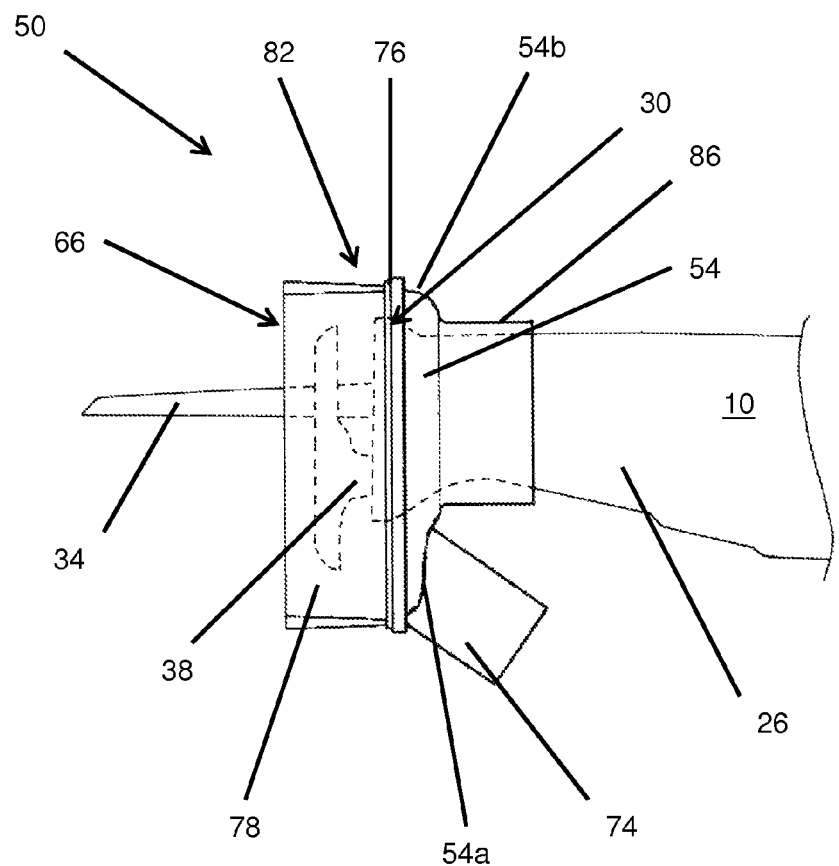
FIG. 5 shows a side view of the shroud of FIG. 2 mounted to a saw.

Turning now to FIG. 5, a side view of the shroud 50 attached to a reciprocating saw 10 is shown. The shroud 50 is attached to the front part of the front hand grip 26. As discussed, the attachment strap 86 is tightened around the collar 70 (not visible) to press the collar against the saw 10 and secure the shroud to the saw. The front flange 30 and front plate 38 are disposed within the dust collection chamber 66, and the bristles 78 extend past the front plate 38. As is seen, the saw 10 has an elongate and linear body 14 with a blade 34 that is collinear with the body. The shroud 50 attaches to the saw 10 so that the collar 70 is oriented parallel to the saw body 14 and so that the bristles 78 and shroud body 54 extend in a plane perpendicular to the saw body. When installed on a saw 10, the front flange 30 of the saw body 14 is disposed generally parallel to the bottom edge 76 of the shroud body 54. The front flange 30 of the saw 10 is disposed adjacent to the bottom edge 76 of the shroud body 54 near a common position along the length of the saw body 14.

The front plate 38 is usually disposed about an inch in front of the front flange 30. As such, the front plate 38 is often disposed distally from the bottom edge 76 of the shroud body 54 by about an inch or so. Often, the shroud bristles 78 are about 2 inches long. Thus, the front plate 38 is often disposed near the middle of the bristles 78 lengthwise. The front plate 38 is often disposed near the middle third of the bristles. The blade 34 extends forwards beyond the front plate 38 and bristles 78. The blade 34 is oriented parallel to the length of the saw body 14. As such, the blade 34 is oriented generally perpendicular to the bottom edge of the shroud body 54. The blade 34 will generally extend several inches or more beyond the bristles 78.

In use, the front plate 38 will typically contact the material being cut. The front plate 38 stabilizes the saw 10 against the motion of the blade 34 which oscillates along its length perpendicular to the front plate 38 and lower edge 76 of the shroud. The bristles 78 will also typically contact the material being cut, and will bend to allow the front plate 38 to contact the material being cut. The bristles 78 assist in sealing the perimeter of the dust collection chamber 66 around the material being cut. While the bristles do not completely seal around the blade, they will reduce the open area sufficiently that the airflow drawn through the bristles and into the shroud will capture the dust and debris. The slot 82 allows an operator to see the blade 34 during use and accurately guide the saw. Additionally, the slot 82 forms an air opening into the dust collection chamber. Because the slot 82 is disposed on the side of the shroud body 54 which is opposite the vacuum port 74, air flows into the slot 82, across the blade 34 and out the vacuum port 74. This promotes effective removal of dust and debris.

There is thus disclosed an improved dust shroud for a reciprocating saw. It will be appreciated that numerous changes may be made to the present invention without departing from the scope of the claims.

What is claimed is:

1. A dust shroud for reciprocating saws comprising:
a shroud body having an upper surface and a peripheral wall extending downwardly from the upper surface so as to define a dust collection chamber;
a plurality of bristles extending downwardly from the peripheral wall;
a vacuum port attached to the shroud body, the vacuum port having an interior which is open to the dust collection chamber to draw debris from the dust collection chamber;
an attachment collar extending upwardly from the upper surface of the shroud body;

a slot formed through the attachment collar and shroud body such that both the attachment collar and the shroud body can flex to thereby increase and decrease in size; and an attachment strap disposed around the attachment collar, wherein the attachment strap is selectively tightened to reduce the size of the attachment collar to thereby secure the shroud to a reciprocating saw, and wherein the shroud body and dust collection chamber are reduced in size as the attachment collar is reduced in size.

2. The dust shroud of claim 1, wherein the shroud is selectively attachable to one a plurality of different sizes of reciprocating saws by reducing a width of the slot and by reducing the size of the shroud body and dust collection chamber.

3. The dust shroud of claim 1, wherein the peripheral wall extends around substantially all of a perimeter of the dust collection chamber.

4. The dust shroud of claim 1, wherein the vacuum port is disposed on a first side of the shroud body and the slot is disposed on a second side of the shroud body generally opposite the first side.

5. A system comprising the dust shroud of claim 1, and further comprising:
a reciprocating saw having a generally linear and elongate body and having a blade extending from a front of the body in a direction which is generally collinear to the body, the blade being configured to move fore and aft during operation of the saw; and
wherein the dust shroud is attached to the reciprocating saw.

6. The system of claim 5, wherein the dust shroud is attached to the saw such that the attachment collar is disposed in a direction parallel to the saw body and a bottom edge of the peripheral wall is disposed in a plane which is generally perpendicular to a longitudinal axis of the blade.

7. The system of claim 5, wherein the saw has a front plate which contacts material being cut during use of the saw, and wherein the front plate is disposed distally from a bottom edge of the peripheral wall.

8. A dust collection system including a shroud and a reciprocating saw comprising:
a reciprocating saw having an elongate generally linear body and a blade extending outwardly from a front end of the body in a direction generally collinear with the body;
a dust shroud comprising:
a shroud body, the shroud body having:
an upper surface;
a peripheral wall extending downwardly from the upper surface to define a dust collection chamber;
a bottom edge of the peripheral wall;
an attachment system extending upwardly from the upper surface allowing for the shroud to be attached to the saw;
a slot extending through a part of the attachment system, the upper surface, and the peripheral wall in alignment with a longitudinal axis of the blade when the shroud is attached to the saw;
a vacuum port attached to the shroud body and disposed in communication with the dust collection chamber to draw dust therefrom; and
wherein, when the dust shroud is attached to the saw the bottom edge of the peripheral wall is disposed in a plane which is generally perpendicular to a line disposed along a length of the blade and the body of the saw.

9. The system of claim 8, wherein the part of the attachment system is a collar extending upwardly from the shroud body and wherein the slot extends through the attachment collar.

10. The system of claim 8, wherein the peripheral wall extends around substantially all of the perimeter of the dust collection chamber.

11. The system of claim 8, wherein the slot is of generally uniform width.

12. The system of claim 8, wherein the saw comprises a front work contacting plate and wherein the front work contacting plate is positioned beyond the bottom edge of the peripheral wall.

13. The system of claim 8, further comprising bristles extending from the bottom edge of the peripheral wall.

14. The system of claim 13, wherein, when the shroud is attached to the saw, a saw front work contacting plate is positioned adjacent a middle of the bristles lengthwise.

15. The system of claim 8, wherein the shroud body is flexible and is reduced in size, via the slot, when the attachment system is attaches the shroud to the saw.

16. A dust shroud comprising:
a shroud body having an upper surface and a peripheral wall extending downwardly from the upper surface so as to form a dust collection chamber;
a vacuum port attached to the shroud body, the vacuum port having an interior which is open to the dust collection chamber to draw debris from the dust collection chamber;
an attachment collar extending upwardly from the upper surface of the shroud body;
a clamp disposed around the attachment collar to secure the attachment collar to a tool;
a slot formed through the attachment collar, upper surface, and peripheral wall; and
wherein the peripheral wall extends around substantially all of the dust collection chamber.

17. The dust shroud of claim 16, further comprising a plurality of bristles extending downwardly from the peripheral wall.

18. The dust shroud of claim 16, wherein the attachment collar and the shroud body are flexible via the slot; and
wherein the clamp is tightened around the attachment collar to thereby secure the shroud to the tool, and wherein the shroud body and dust collection chamber are reduced in size, via the slot, when the attachment collar is secured to the tool via the clamp.

19. A system comprising the dust shroud of claim 16, and further comprising:
a reciprocating saw having a generally linear and elongate body and having a blade extending from a front of the body in a direction which is generally collinear to the body, the blade being configured to move fore and aft during operation of the saw;
wherein the dust shroud is attached to the reciprocating saw and;
wherein the slot is disposed in alignment with a longitudinal axis of the blade.

20. A system comprising the dust shroud of claim 16, and further comprising:
a reciprocating saw having a generally linear and elongate body and having a blade extending from a front of the body in a direction which is generally collinear to the body, the blade being configured to move fore and aft during operation of the saw;
wherein the dust shroud is attached to the saw such that the attachment collar is disposed in a direction parallel to the saw body and a bottom edge of the peripheral wall is disposed in a plane which is generally perpendicular to a longitudinal axis of the blade; and wherein the saw has a front plate which contacts material being cut during use of the saw, and wherein the front plate is disposed distally from a bottom edge of the peripheral wall.

\* \* \* \* \*